(12) United States Patent
Nozaki et al.

(10) Patent No.: US 7,798,656 B2
(45) Date of Patent: Sep. 21, 2010

(54) PROJECTOR DEVICE AND PORTABLE TELEPHONE

(75) Inventors: Hirotake Nozaki, Portwashington, NY (US); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 555 days.

(21) Appl. No.: 11/667,704

(22) PCT Filed: Nov. 17, 2005

(86) PCT No.: PCT/JP2005/021109

§ 371 (c)(1),
(2), (4) Date: May 14, 2007

(87) PCT Pub. No.: WO2006/054633

PCT Pub. Date: May 26, 2006

(65) Prior Publication Data

US 2008/0024738 A1    Jan. 31, 2008

(30) Foreign Application Priority Data

Nov. 19, 2004    (JP) .............................. 2004-335425

(51) Int. Cl.
*G03B 21/14* (2006.01)
(52) U.S. Cl. .............................. 353/100; 353/39; 353/43; 353/101; 353/122; 396/52; 396/56; 396/72; 396/73; 396/77; 396/86; 396/87; 396/88; 396/133; 396/469; 359/362; 359/365; 359/381; 359/384; 359/410
(58) Field of Classification Search .................. 396/52, 396/56, 72, 73, 75, 76, 77, 86, 87, 88, 106, 396/111, 133, 469, 430, 431, 432; 353/39, 353/100, 101, 122; 345/1.1, 32, 169, 905; 348/348
See application file for complete search history.

(56) References Cited

U.S. PATENT DOCUMENTS

| 4,621,292 | A | * | 11/1986 | Hirao et al. ................. 348/348 |
| 5,258,844 | A | | 11/1993 | Nakayama et al. |
| 5,300,976 | A | | 4/1994 | Lim et al. |
| 5,528,297 | A | | 6/1996 | Seegert et al. |
| 6,489,934 | B1 | * | 12/2002 | Klausner .................... 345/1.1 |

FOREIGN PATENT DOCUMENTS

| JP | 03-065879 A | 3/1991 |
| JP | 03-146935 A | 6/1991 |
| JP | A 4-109235 | 4/1992 |
| JP | A 4-123030 | 4/1992 |
| JP | 07-046450 A | 2/1995 |
| JP | 08-146512 A | 6/1996 |
| JP | A 9-326981 | 12/1997 |
| JP | A 10-319506 | 12/1998 |
| JP | A 2000-194275 | 7/2000 |
| JP | A 2002-171428 | 6/2002 |
| JP | A 2002-305567 | 10/2002 |
| JP | A 2004-334117 | 11/2004 |

* cited by examiner

*Primary Examiner*—Georgia Y Epps
*Assistant Examiner*—Sultan Chowdhury
(74) *Attorney, Agent, or Firm*—Miles & Stockbridge P.C.

(57) ABSTRACT

A projector device, includes: a projector unit, including a light source and a projection lens whose focal position is variable, that projects an image upon a projection surface with a light flux outputted from the light source that passes through the projection lens; an image-capturing unit, including a photographic lens whose focal position is variable, that captures an image of a subject with a light flux from the exterior that passes through the photographic lens; and a single drive source that generates drive force for changing both the focal position of the projection lens and the focal position of the photographic lens.

16 Claims, 5 Drawing Sheets

FIG.4
(a)
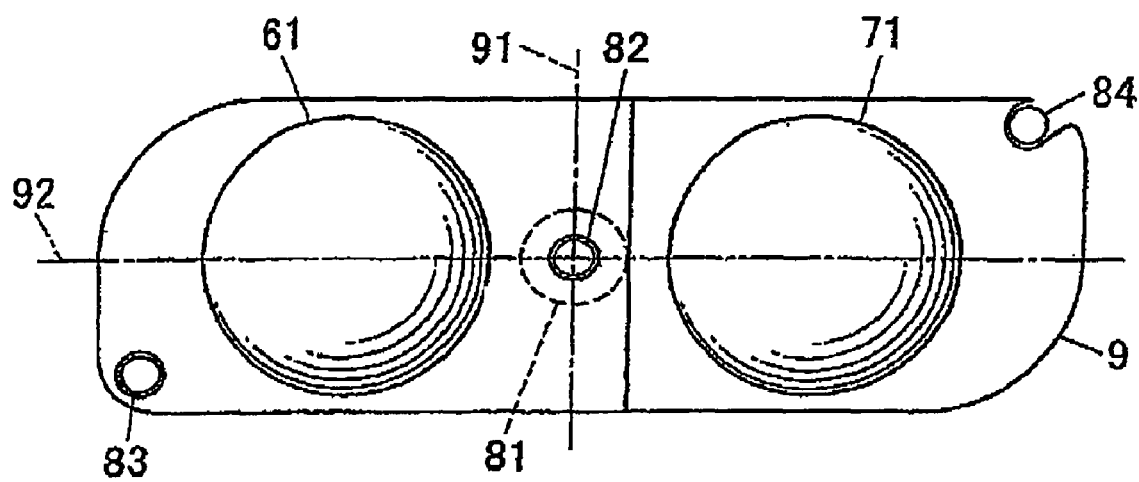
(b)
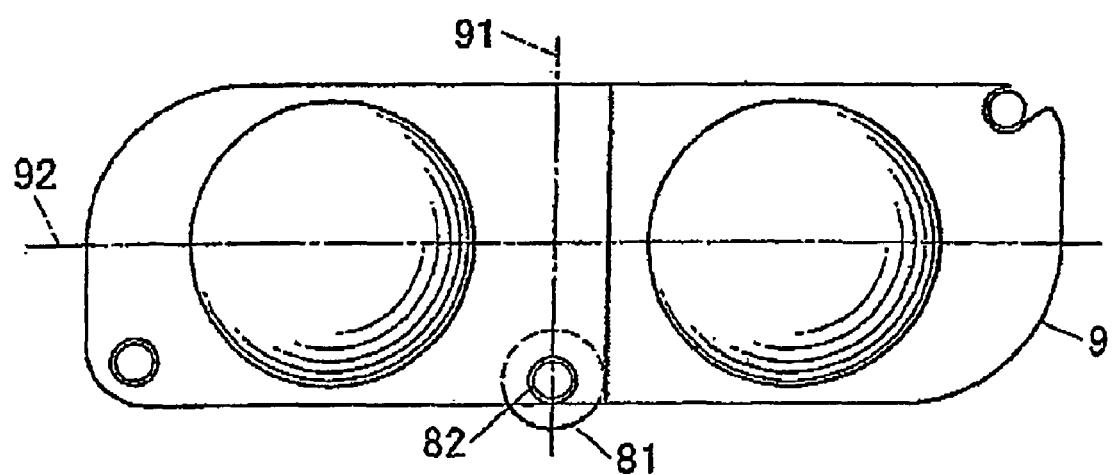

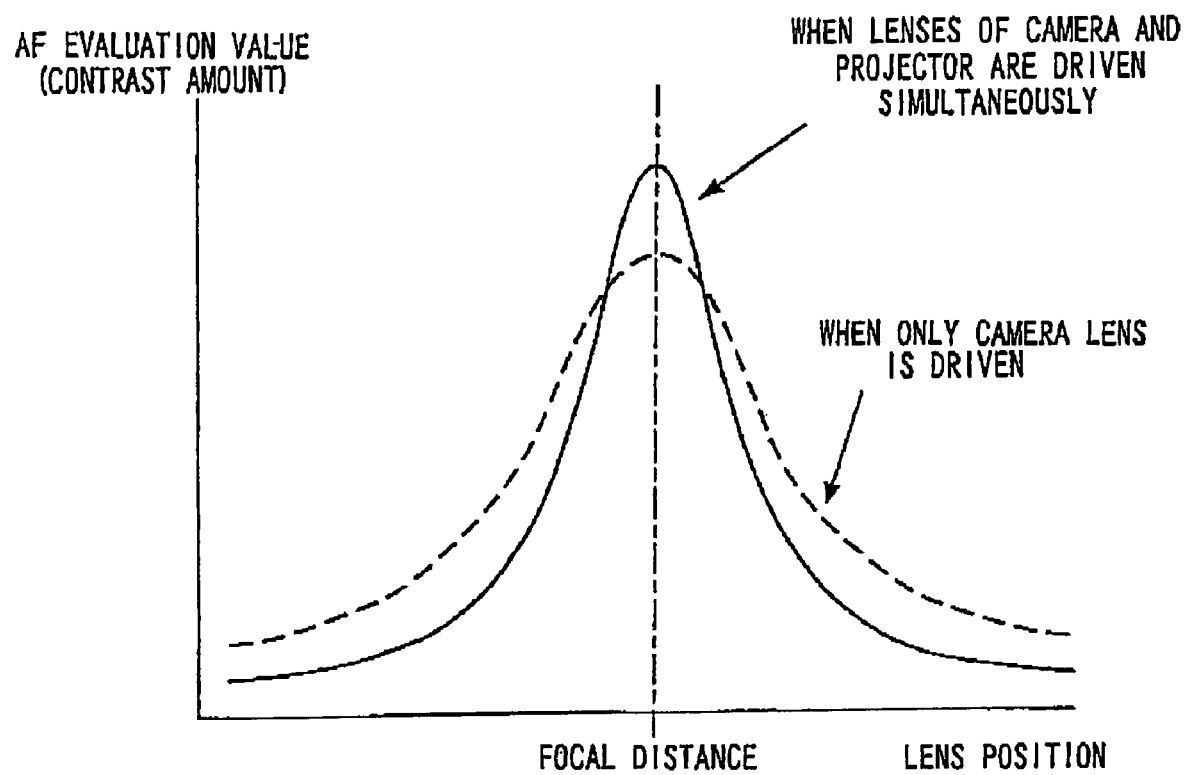

PROJECTOR DEVICE AND PORTABLE TELEPHONE

TECHNICAL FIELD

The present invention relates to a projector device, such as a projection type liquid crystal projector using a liquid crystal display panel, that projects an image upon a projection surface to generate the projected image, and that is a handy type projector device or the like that is incorporated in a portable telephone or a camera.

BACKGROUND ART

A portable terminal device incorporating a camera for image photography and a projection display section (a projector) for projecting an image upon the surface of a screen or the like is known (refer to Patent Reference #1).
[Patent Reference 1]: Japanese Laid-Open Patent Publication 2002-305567.

DISCLOSURE OF THE INVENTION

Problems to be Solved by the Invention

With the portable terminal device disclosed in Patent Reference #1, due to the incorporation of both a projector and a camera, there is the problem that this entails an increase in the cost and an increase in the size of the device. In particular, when adjusting the projection focal point position of the projector and the photographic focal point position of the camera, in the projector it is necessary to adjust the position of the projection lens, and in the camera it is necessary to adjust the position of the photographic lens. Accordingly, it is necessary to provide both a mechanism for adjusting the position of the projection lens and a mechanism for adjusting the position of the photographic lens, and this entails an increase in the cost and an increase in the size of the device.

Means for Solving the Problems

According to the 1st aspect of the present invention, a projector device, comprises: a projector unit, including a light source and a projection lens whose focal position is variable, that projects an image upon a projection surface with a light flux outputted from the light source that passes through the projection lens; an image-capturing unit, including a photographic lens whose focal position is variable, that captures an image of a subject with a light flux from the exterior that passes through the photographic lens; and a single drive source that generates drive force for changing both the focal position of the projection lens and the focal position of the photographic lens.

According to the 2nd aspect of the present invention, in the projector device according to the 1st aspect, it is preferred that the projection lens and the photographic lens are such that a ratio of an amount of change of the focal position of the projection lens with respect to a drive amount of the drive source, and a ratio of an amount of change of the focal position of the photographic lens with respect to the drive amount of the drive source, are equal.

According to the 3rd aspect of the present invention, in the projector device according to the 2nd aspect, it is preferred that the projection lens and the photographic lens have the same optical characteristics.

According to the 4th aspect of the present invention, in the projector device according to the 3rd aspect, it is preferred that the projection lens and the photographic lens are made as identical lens groups each including a plurality of lenses.

According to the 5th aspect of the present invention, in the projector device according to any one of the 2nd through 4th aspects, it is preferred that: there is further provided a lens support unit that supports the projection lens and the photographic lens so that optical axes of the projection lens and the optical axis of the photographic lens are parallel to each other, with an operating point for reception of drive force from the drive source being provided in a vicinity of a center of gravity position in a supporting state; and the focal positions of the projection lens and the focal position of the photographic lens are changed by shifting the lens support unit with drive force that the drive source applies at the operating point.

According to the 6th aspect of the present invention, in the projector device according to any one of the 1st through 5th aspects, it is preferred that the focal position of the projection lens and the focal position of the photographic lens are changed so that their respective focal distances are always almost equal.

According to the 7th aspect of the present invention, in the projector device according to the 1st aspect, it is preferred that there is further provided a drive mechanism that drives the projection lens and the photographic lens simultaneously with the drive force of the drive source.

According to the 8th aspect of the present invention, in the projector device according to the 7th aspect, it is preferred that the drive mechanism drives the projection lens and the photographic lens so that the focal position of the projection lens and the focal position of the photographic lens are located within the same plane with respect to the projector device.

According to the 9th aspect of the present invention, in the projector device according to the 8th aspect, it is preferred that: the projection lens and the photographic lens have the same optical characteristics and are linked to the same drive member; and the drive mechanism drives the drive member.

According to the 10th aspect of the present invention, in the projector device according to the 8th aspect, it is preferred that: the projection lens and the photographic lens are lens groups each having a plurality of lenses and have the same optical characteristics, with respective lenses for focal point adjustment being linked to the same drive member; and the drive mechanism drives the drive member.

According to the 11th aspect of the present invention, a portable telephone, comprises: a projector device according to any one of the 1st through 10th aspects; and a wireless communication unit that performs communication with another terminal via an external wireless communication facility.

According to the 12th aspect of the present invention, a projector device, comprises: a projector unit, including a light source and a projection lens, that projects an image upon a projection surface with a light flux outputted from the light source that passes through the projection lens; and an image-capturing unit, including a photographic lens having the same optical characteristics as the projection lens, that captures an image of a subject with a light flux from the exterior that passes through the photographic lens.

According to the 13th aspect of the present invention, in the projector device according to the 12th aspect, it is preferred that the projection lens and the photographic lens are made as identical lens groups each including a plurality of lenses.

It should be understood that, in the above description, it would be acceptable to replace "projector unit" by "projection means", "image-capturing unit" by "image-capturing means", "drive source" by "drive source means", "lens support unit" by "lens support means", "drive mechanism" by "drive means", and "wireless communication unit" by "wireless communication means".

Advantageous Effect of the Invention

It is arranged for the focal point position of the projection lens and the focal point position of the photographic lens to be changed together by the drive force generated by the single drive source. Since this is done, in a device in which a projector and a camera are included, it is possible to suppress increase in cost and increase in size of the device, in particular in relation to adjustment of its projection focal point position and of its photographic focal point position.

Furthermore, if the projection lens and the photographic lens have the same optical characteristics, then it is possible to standardize certain components in common for the projection lens and the photographic lens, so that it is possible further to suppress increase in cost of a device that incorporates a projector and a camera.

BRIEF DESCRIPTION OF THE DRAWINGS

FIG. 4 is a figure showing arrangements of the projector module and the camera module shown in the sectional view of FIG. 3, as seen from the direction of the rear surface of the portable telephone device; and FIG. 5 is a figure showing the way in which an AF evaluation value changes with change of lens position.

BEST MODE FOR CARRYING OUT THE INVENTION

Figure 1:
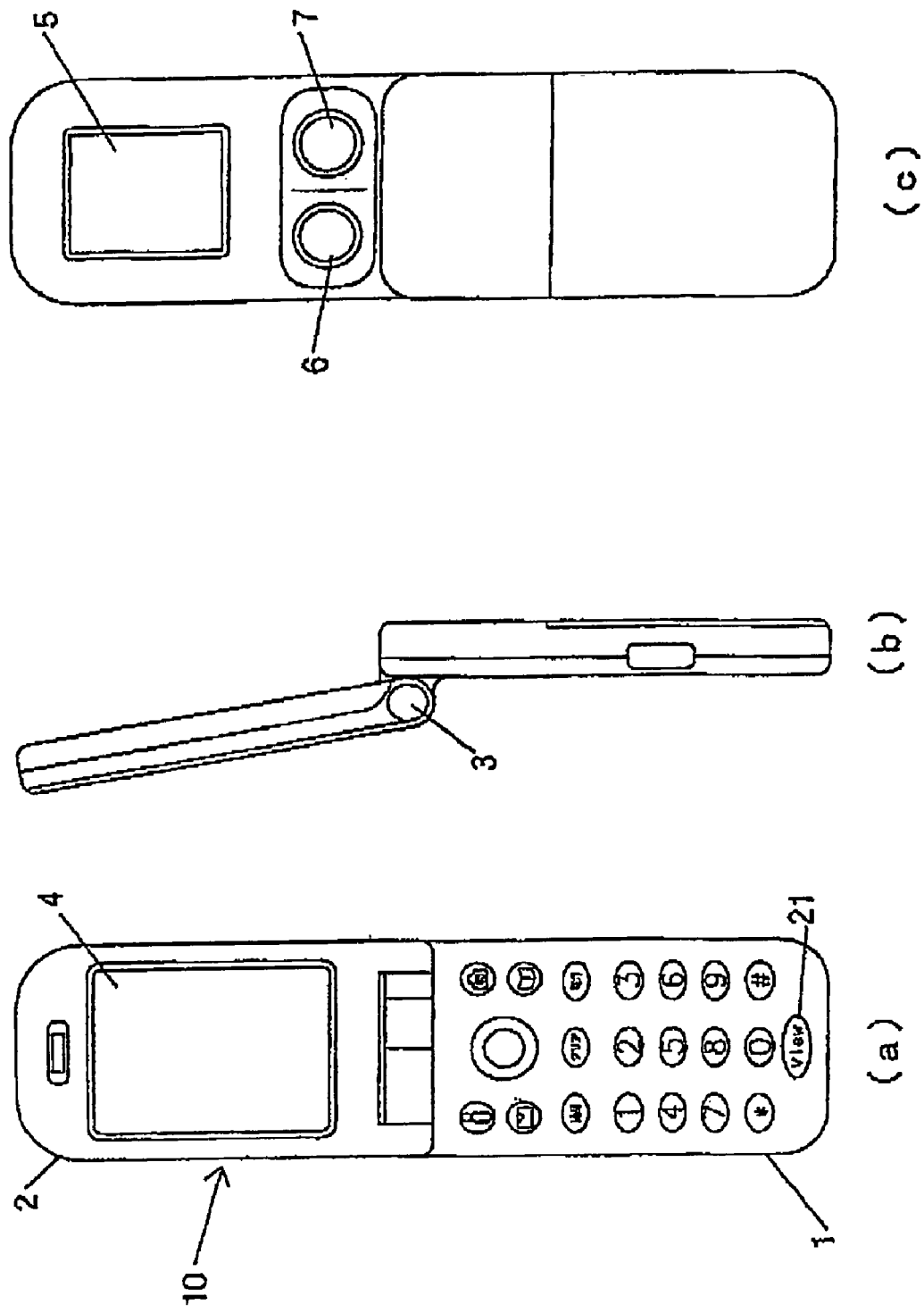
FIG. 1 is a figure showing the external appearance of a portable telephone device with incorporated projector according to an embodiment of the present invention.

In the following, an embodiment of the present invention will be explained with reference to the drawings. FIG. 1 is a figure showing the external appearance of a portable telephone device with incorporated handy type projector 10 that can be portable, according to an embodiment of the present invention. (a) shows an elevation view thereof, (b) shows a side view, and (c) shows a rear view. In FIG. 1, the body of this portable telephone device with incorporated projector 10 consists of an actuation (operation) unit 1 and a display section 2, and this actuation unit 1 and display section 2 are connected together via a rotatable folding hinge unit 3. In other words, this portable telephone device with incorporated projector 10 has a foldable structure, centered around the folding hinge 3.

Various types of actuation key for receiving actuation input from the user are disposed upon the actuation unit 1. These actuation keys include keys that are the same as those of a conventional portable telephone device, providing a camera function, a mail transmission and reception function, a function of connection to the internet, and the like. For example, there are included actuation keys for starting and ending a telephone conversation, actuation keys for inputting telephone numbers and characters and the like, cursor keys for screen operations, actuation keys for transiting to various types of operation mode, such as a camera photography mode, a mail transmission and reception mode, a mode for connection to the internet, and the like.

Upon the actuation unit 1, in addition to the same actuation keys as in a conventional portable telephone device, there are also disposed actuation keys for transiting to a mode (a projector mode) in which an image is projected using a projector module 6 that will be described hereinafter. For example, when an actuation key shown by the reference symbol 21 is pressed, the system transitions to the projector mode, and an image is projected upon a projection surface such as a screen or a wall surface or the like by a projector module 6 as will be explained hereinafter, so that a projected image of this image is created.

A main liquid crystal display device 4 is disposed upon the front side of the display section 2, and a sub-liquid crystal display device 5 is disposed upon its rear side. The projector module 6 and a camera module 7 are also disposed upon the rear side of the display section 2.

Figure 2:
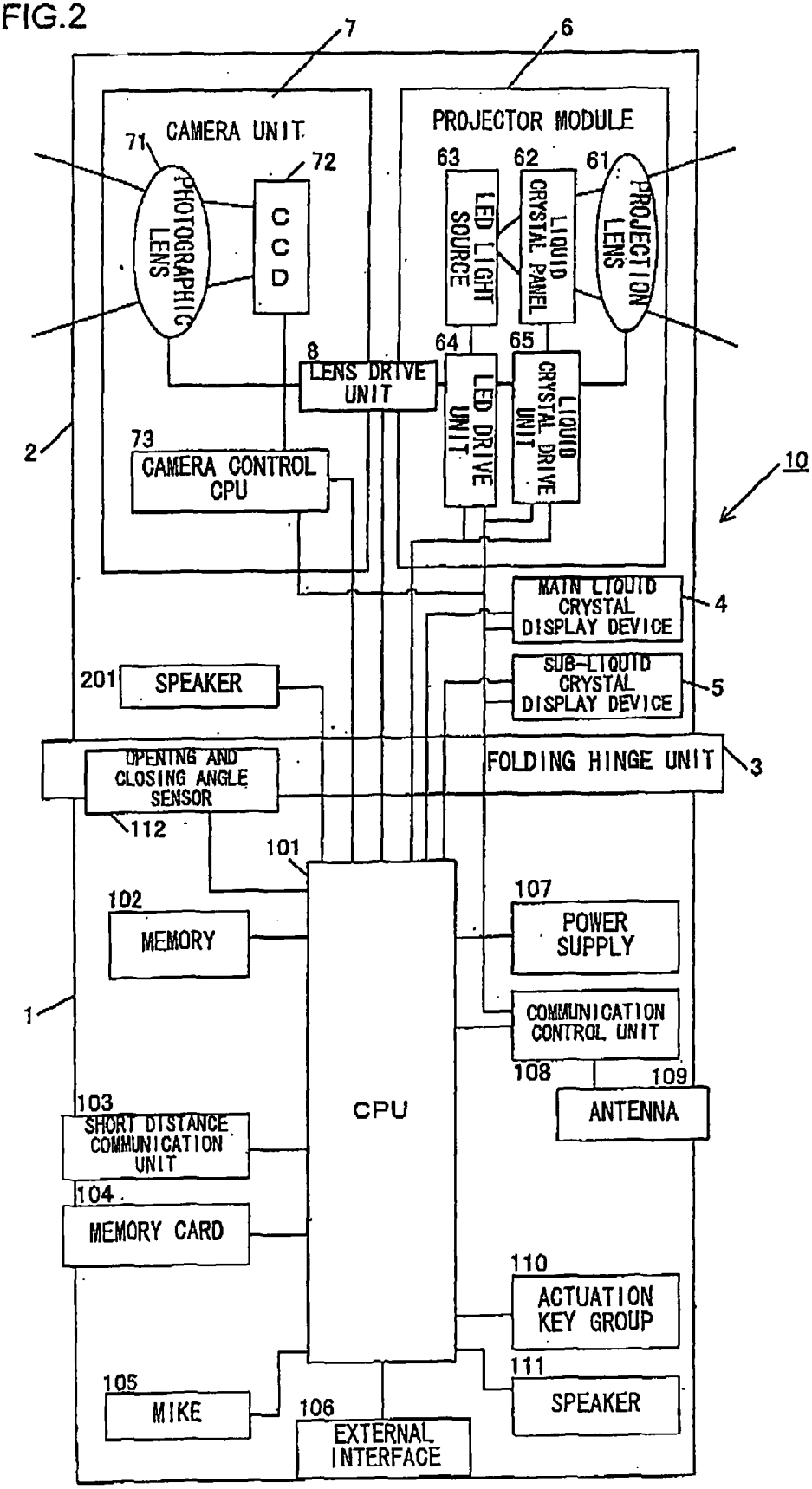
FIG. 2 is a block diagram of this portable telephone device with incorporated projector.

FIG. 2 is a block diagram for explanation of the structure of the portable telephone device with incorporated projector 10 of FIG. 1. In FIG. 2 there are included, on the side of the actuation unit 1, a CPU 101, a memory 102, a short distance communication unit 103, a mike (microphone) 105, an external interface (I/F) 106, a power supply 107, a communication control unit 108, an antenna 109, an actuation key group 110, a speaker 111, and an opening and closing angle sensor 112; and a removable memory card 104 is implemented.

On the side of the display section 2, there are provided the main liquid crystal display device 4, the sub-liquid crystal display device 5, the projector module (projector unit) 6, the camera module (camera unit) 7, and a speaker 201.

Based upon a control program, the CPU 101 performs predetermined calculations using signals that are inputted from various units making up this portable telephone device with incorporated projector 10, and outputs control signals to various parts of the portable telephone device with incorporated projector 10. Due to this, it controls its operation as a telephone device, its camera operation, and its projector operation. It should be understood that this control program is stored in a non-volatile memory within the CPU 101, not shown in the figures.

The memory 102 is used by the CPU 101 as a working area. The short distance communication unit 103 consists of, for example, an infrared communication circuit, and transmits and receives data to and from an external device, according to commands from the CPU 101. Furthermore, the external interface 106 transmits and receives data to and from an external device, via a cable or cradle not shown in the figures, according to commands from the CPU 101. And it is possible to input various types of image and audio data from an external device by using the short distance communication unit 103 or the external interface 106.

The memory card 104 consists of a non-volatile memory, and, according to commands from the CPU 101, it is possible to store and read out, for example, image data outputted by the camera module 7, or data such as image or audio data or the like that is inputted from an external device via the short distance communication unit 103 or the external interface 106.

The mike 105 converts audio that it has captured into an electrical signal, that it sends to the CPU 101. During sound recording this audio signal is recorded upon the memory card 104, while during telephone conversation it is sent to the communication control unit 108. And the speaker 111 replays audio that has been outputted from the CPU 101 as an audio signal. Moreover, an actuation key group 110 shows the various types of actuation key previously described by a single block, and sends an actuation signal corresponding to an actuation key that has been depressed to the CPU 101.

The communication control unit 108 includes a wireless transmission and reception circuit, and performs communication with other telephone devices via a base station not shown in the figures, according to commands from the CPU 101. This communication control unit 108 is adapted to be able to perform transmission and reception of, not only telephone audio, but also image data that has been photographed with the camera module 7, image data for projection by the projector module 6, and the like. And the antenna 109 is a transmission reception antenna of this communication control unit 110.

The power supply 107 consists of, for example, a removable battery pack and a DC/DC conversion circuit and the like, and supplies the necessary electrical power to the various sections within this portable telephone device 10. And the opening and closing angle sensor 112 detects the rotational angle of the folding hinge unit 3, in other words the folding angle θ of this portable telephone device with incorporated projector, and sends it to the CPU 101.

The main liquid crystal display device 4 and the sub-liquid crystal display device 5 both display information such as an image or text or the like, according to commands from the CPU 101. And, during a telephone conversation, the speaker 201 replays audio from a voice signal that is outputted from the CPU 101.

The projector module 6 includes a projection lens 61, a liquid crystal panel 62, a LED light source 63, a LED drive unit 64, and a liquid crystal drive unit 65. The LED drive unit 64 supplies electrical current to the LED light source 63, according to a LED drive signal that is outputted from the CPU 101. The LED light source 63 illuminates the liquid crystal panel 62 by irradiating it with lights of the three primary colors, R (red), G (green), and B (blue), according to the electrical current that is supplied. By combining the lights of these various colors, white colored light is irradiated from the LED light source 63. It should be understood that it is possible to adjust the intensities of the lights of each of the colors R, G, and B individually, according to the electrical current intensities from the LED drive unit 64.

The liquid crystal drive unit 65 generates a liquid crystal panel drive signal according to the image data, and displays an image upon the liquid crystal panel 62 by driving the liquid crystal panel 62 with this generated drive signal. In concrete terms, a voltage corresponding to the image signal is applied to each pixel in the liquid crystal layer. The arrangement of the liquid crystal molecules in the liquid crystal layer to which voltage is thus applied is changed, so that the transmittivity to light of the liquid crystal layer changes. Due to these changes of transmittivity, an image is displayed. It should be understood that a color filter is provided upon the liquid crystal panel 62, and each of the pixels corresponds to one color of R, G, and B. And, due to this, a color image may be displayed upon the liquid crystal panel 62 by combining pixels of the colors R, G, and B.

The image displayed upon the liquid crystal panel 62 may be selected from among various types of image, such as an image stored upon the memory card 104, an image inputted from an external device, an image captured by the camera module 7 as will be described hereinafter, or the like. It would also be acceptable that the image displayed upon the liquid crystal panel 62 is the same as the image displayed upon the main liquid crystal device 4 or the image displayed upon the sub-liquid crystal display device 5, and is a movie image. Moreover, it would also be acceptable to arrange to select and to display a mail document or the like.

After the image that has been selected as described above has been displayed upon the liquid crystal panel 62, a optical image of this image displayed upon the liquid crystal panel 62 is generated by passing white colored light synthesized from the light of the colors R, G, and B irradiated from the LED light source 63 through it. A lens drive unit 8 is connected to the projection lens 61. Based upon a control signal outputted from the CPU 101, this lens drive unit 8 drives a focal point (focus) adjustment lens (not shown in the figures) that is incorporated in the projection lens 61 to and from along the optical axis, and thereby changes the focal point position (hereinafter termed the 'projection focal point position') of the projection lens 61.

Adjustment of the focal state of the projected image is performed by changing the focal point position of the projection lens 61 in this manner. The light flux (ray bundle) outputted from the LED light source 63 that has passed through the liquid crystal panel 62 is passes through the projection lens 61 and is projected towards the projection surface of a screen or the like. By doing this, the image that has been selected is projected upon the projection surface using white colored light synthesized by combining the light of the colors R, G, and B, so that a projected image of this image is generated.

The camera module 7 includes a photographic lens 71, an image sensor 72, and a camera control CPU 73. A CCD or a CMOS image capture element (image sensor) or the like is used as the image sensor 72. The camera control CPU 73 drive controls this image sensor 72 according to commands from the CPU 101. The same lens drive unit 8 as for the projection lens 61 is connected to the photographic lens 71. This lens drive unit 8 changes the focal point (focus) position of the photographic lens 71 (hereinafter termed the "photographic focal point position") by driving a focal point adjustment lens (not shown in the figures) that is included in the photographic lens 71 to and from along the optical axis, according to a control signal from the CPU 101. By doing this, adjustment of the focus of the image of the photographic subject is performed.

The photographic lens 71 images an image of the photographic subject upon an image capture surface of the image sensor 72. The camera control CPU 73 starts image capture upon the image sensor 72, reads out an accumulated electric charge signal from the image sensor 72 after image capture has ended, and sends it to the CPU 101 as image data after having performed predetermined signal processing thereupon. It should be understood that, if image data that has been photographed by the camera module 7 is to be transmitted, image data is sent from the CPU 101 to the communication control unit 108. Moreover, when projecting a photographed image, the image data is sent from the camera control CPU 73 via the CPU 101 to the projector module 6. By doing this, a captured image of the photographic subject that has been photographed by the camera module 7 is acquired.

Figure 3:
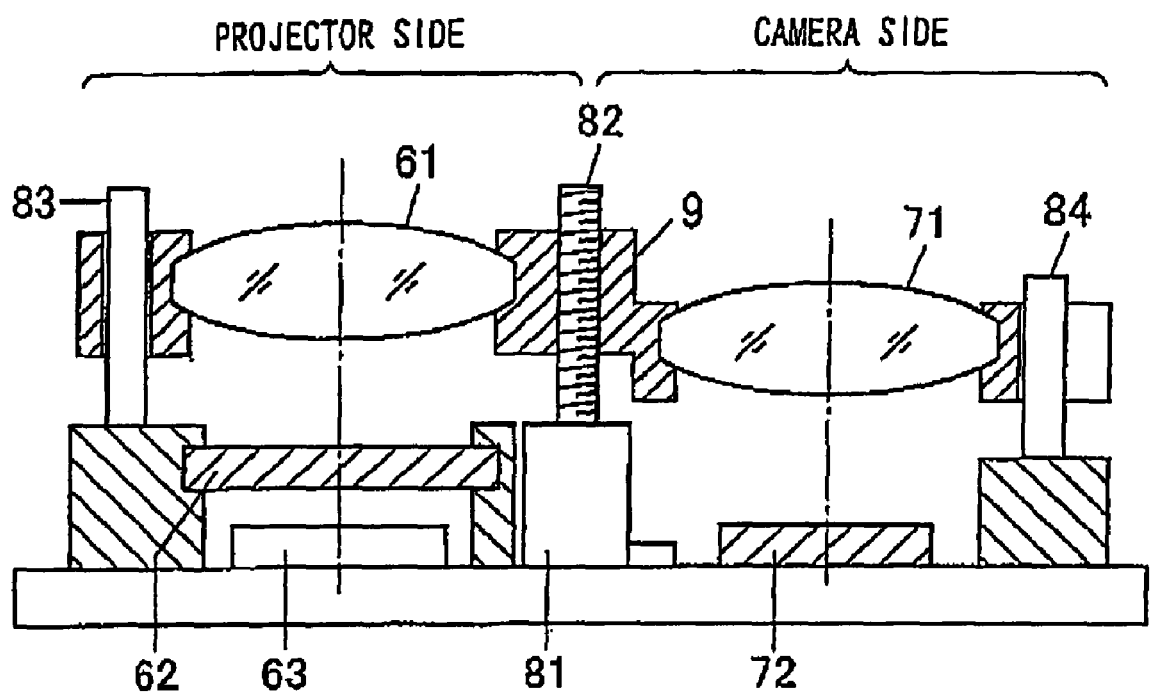
FIG. 3 is a sectional view of a projector module and a camera module.

FIG. 3 is a figure showing a cross section of the projector module 6 and the camera module 7. The lens drive unit 8 of FIG. 2 includes the lens drive motor 81, a rotation shaft 82, and guide shafts 83 and 84 shown in FIG. 3. The lens drive motor 81 is a single drive source that generates a rotational drive force for changing both the projection focal point position and the photographic focal point position, and its drive amount is controlled by the CPU 101. The rotation shaft 82 is rotated by the rotational drive of the lens drive motor 81, and, as will be explained hereinafter, its drive force is transmitted to the projection lens 61 and the photographic lens 71. The guide shafts 83 and 84 are shafts for providing guidance when shifting the positions of both the projection lens 61 and the photographic lens 71 along the optical axis.

FIG. 4 is a figure showing the projector module 6 and the camera module 7 that are shown in the sectional view of FIG. 3, as seen from the upper portion of FIG. 3; in other words arrangement thereof as seen from the direction of the rear surface of the portable telephone device 10. In (a) there is shown a case in which the rotation shaft 82 is positioned over the center line 92 that connects together the center points of the projection lens 61 and the photographic lens 71. On the other hand, in (b) there is shown a case in which the rotation shaft is not positioned over this center line 92. In both of the cases (a) and (b), both the projection lens 61 and the photographic lens 71 are supported by a lens support unit 9. And, in this state in which the lens support unit 9 is supporting the projection lens 61 and the photographic lens 71, in both cases, the rotation shaft 82 is positioned upon the center of gravity line 91 designating the position of the center of gravity at which its weight is balanced to left and right.

It should be understood that it would be acceptable for the projector module 6 and the camera module 7 to be built as shown in either (a) or (b). Moreover, provided that the position of the rotation shaft 82 is in the vicinity of the center of gravity line 91, it is not limited to being the position shown in (a) or (b); either position would be acceptable.

The lens support unit supports the projection lens 61 and the photographic lens 71 so that their optical axes are parallel to one another. This lens support unit 9 is engaged with the rotation shaft 82 by a screw, and shifts along the direction of the optical axis along with rotation of the rotation shaft 82. In other words, the portion at which the lens support unit 9 and the rotation shaft 82 are engaged with each other like a screw constitutes an operating point, and the lens support unit 9 receives the drive force from the lens drive motor 81 at this operating point. And the lens drive motor changes the projection focal point position and the photographic focal point position by shifting the lens support unit 9 along the direction of the optical axis with the drive force that it applies at this operating point.

It should be understood that although, here, each of the projection lens 61 and the photographic lens 71 is shown in the figure as being a single lens, actually these lenses are identical lens groups, each consisting of a plurality of lenses that have different optical characteristics. And it is possible to change each of the projection focal point position and the photographic focal point position by shifting the lens support unit 9 and thereby driving a respective focal point adjustment lens, included in each of these pluralities of lenses, in the to and from direction along the optical axis as described above. In other words, the lens support unit 9 supports or is linked to the focal point adjustment lenses of both the projection lens 61 and the photographic lens 71, and drives both of these focal point adjustment lenses in the same direction at the same time. Accordingly, the lens support unit 9 operates as a drive member that drives both of these focal point adjustment lenses.

Furthermore, the projection lens 61 and the photographic lens 71 have the same optical characteristics. Due to this, the ratio of the amount of change of the projection focal point position with respect to the drive amount of the lens drive motor 81, and the ratio of the amount of change of the photographic focal point position with respect to the drive amount of the lens drive motor 81, are equal to one another. Accordingly, it is possible to change the projection focal point position and the photographic focal point position so that the focal distances of both of the projection lens 61 and the photographic lens 71 are always almost equal to one another. To put this in another manner, the projection focal point position and the photographic focal point position change so that they are always located in the same plane with respect to the portable telephone device 10. It should be understood that the focal distance is the distance from the projection lens 61 to the projection focal point position or from the photographic lens 71 to the photographic focal point position, in other words the distance from the portable telephone device 10 to the projection focal point position or to the photographic focal point position.

During projection of this projected image, this portable telephone device with incorporated projector 10 repeatedly executes operation for adjusting the projection condition upon the projection surface of the projected image generated by the projector module 6 having the structure described above (hereinafter termed the calibration operation). In this calibration operation, there are included adjustment of the focus state in order to project a projected image whose focus has been adjusted, adjustment of the brightness and the white balance of the projected image, correction of trapezoidal deformation, and the like. These calibration operations are performed based upon a captured image of the projected image that is acquired by photography by the camera module 7 having the structure described above; but detailed explanation thereof will herein be omitted.

It should be understood that a so-called contrast detection method is used in this focus adjustment of the image captured by the camera module 7. In concrete terms, captured images are acquired while making various kinds of change of the photographic focal point position, and the contrast amounts are calculated for each of these captured images. And the contrast amounts of these captured images are compared by the CPU 101, and the lens drive motor 81 is driven so as to set the photographic focal point position to its position when the captured image whose contrast is maximum was acquired. When this is done, as described above, the projection focal point position is also changed in agreement with the photographic focal point position, so that the focal distances of the projection lens 61 and the photographic lens 71 become both almost mutually equal.

Here, the closer the projection focal point position is to the projection surface, the higher is the contrast of the projected image that is generated, and the closer is the photographic (image capture) focal point position to the projection surface, the higher is the contrast of the captured image of the projected image that is acquired. Accordingly, since as described above the photographic focal point position and the projection focal point position are changed so that the focal distances of both the projection lens 61 and the photographic lens 71 are always almost equal, therefore it is possible to make the difference between the contrast amounts that are calculated in the focused state and in the non-focused state great, and it is possible to adjust both the photographic focal point position and also the projection focal point position accurately and moreover at high speed.

This situation is shown in FIG. 5. In FIG. 5 the contrast amount, that is the AF evaluation value, is shown along the vertical axis, while the lens position is shown along the horizontal axis. If the photographic focal point position and the projection focal point position are moved simultaneously, then the AF evaluation value changes, for example, as shown in the solid line graph. By contrast, if only the photographic focal point position is moved, then the AF evaluation value changes, for example, as shown in the broken line graph. When the photographic focal point position and the projection focal point position are moved simultaneously in this manner, then it is possible to make the amount of change of the AF evaluation value greater, as compared with the case in which the photographic focal point position only is moved, and it is possible to make its peak value greater.

Accordingly, it is possible to adjust the photographic focal point position and the projection focal point position more accurately and moreover at high speed. It should be understood that, if yet a further level of high accuracy is required, then it will be effective, after having temporarily adjusted to a photographic focal point position and a projection focal point position obtained by a method like that described above, to change the photographic focal point position and the projection focal point position within a narrower range of the focal point position narrowed down further upon this position as a center, and to repeat the same processing as above.

According to the embodiment explained above, the following beneficial operational effects are realized.

(1) It was arranged to change the focal point position of the projection lens 61 and the focal point position of the photographic lens 71 in common with the drive force generated by the lens drive motor 81, that is a single drive source. Since this is done, accordingly it is possible to keep down increase in cost and increase in size of the device, when adjusting this projection focal point position and photographic focal point position in a device that incorporates a projector and a camera.

(2) It was arranged for the projection focal point shift coefficient, that is the ratio of the amount of change of the projection focal point position with respect to the drive amount of the lens drive motor 81, and the photographic focal point shift coefficient, that is the ratio of the amount of change of the photographic focal point position with respect to the drive amount of the lens drive motor 81, to be equal to one another. Since this is done, accordingly, when changing both the projection focal point position and also the photographic focal point position in common with a single drive source, it is possible to change both of these in the same manner.

(3) It was arranged for the projection lens 61 and the photographic lens 71 to have the same optical characteristics. In concrete terms, it was arranged for the projection lens 61 and the photographic lens 71 to be made as identical lens groups, each consisting of a plurality of lenses having different optical characteristics. Since this is done, accordingly it is possible to increase the number of components that the projection lens and the photographic lens have in common, so that it is possible to suppress increase in the cost to a further level.

(4) In the state in which the lens support unit 9 was supporting the projection lens 61 and the photographic lens 71, it was arranged to change the projection focal point position and the photographic focal point position by shifting the lens support unit 9 with a drive force imparted by the lens drive motor 81 acting at an operating point that was provided in the vicinity of their center of gravity position. Since this is done, accordingly it is possible to transmit the drive force from the drive source to the projection lens and the photographic lens with good efficiency.

(5) Since the projection focal point position and the photographic focal point position change so that the focal distances of both of them are always almost equal, accordingly it is possible to obtain a greater difference in the contrast amounts that are calculated in the focused state and in the non-focused state, so that it is possible to adjust the photographic (image capture) focal point position and the projection focal point position in an accurate manner and moreover at high speed.

It should be understood that, in the embodiment described above, an example was explained in which a projection lens and a photographic lens were used whose focal point positions are variable, and the focal point positions of both of these lenses were varied with a single drive source. However, it is not necessary to employ this arrangement; it would also be acceptable to keep the focal point positions of the projection lens and the photographic lens fixed. In this type of case, if it is arranged for the projection lens and the photographic lens to have the same optical characteristics, then, in the same manner as described above, it is possible to suppress increase in the cost of the device that incorporates this projector and camera, since it is possible to increase the number of components that the projection lens and the photographic lens have in common. Furthermore, in this case, it would also be acceptable to arrange for the projection lens and the photographic lens to be made from identical lens groups, each consisting of a plurality of lenses that have different optical characteristics.

Furthermore, in the embodiment described above, an example was explained of a portable telephone device with incorporated projector in which a projector function was installed to the portable telephone device. However, provided that the projector device is one that performs its operation in the manner described above, it is not limited to being one that is installed in a portable telephone device; it would also be acceptable for it to be any type of compact portable type electronic device that is endowed with a projector function and a camera function. Or it would also be acceptable to endow an electronic camera such as a digital still camera or the like with a projector function, so that it can perform the above type of operation.

And although, in the embodiment described above, the projection means was explained as being the projector module 6, the image-capturing means was explained as being the camera module 7, and the drive source was explained as being the lens drive motor 81, these were only described by way of example, and are not to be considered as being limitative of the details of the present invention. Other modes of realization of the present invention that may be considered to fall within the scope of its technical conception are also included within the range of the present invention.

The contents of the disclosure of the following patent application, upon which priority is claimed, are hereby incorporated by reference:

Japanese Patent Application 2004-335425 (filed on Nov. 19, 2004).

The invention claimed is:

1. A projector device, comprising:
a projector unit, including a light source and a projection lens whose focal position is variable, that projects an image upon a projection surface with a light flux outputted from the light source that passes through the projection lens;
an image-capturing unit, including a photographic lens whose focal position is variable, that captures an image of a subject with a light flux from the exterior that passes through the photographic lens; and
a single drive source that generates drive force for changing both the focal position of the projection lens and the focal position of the photographic lens, wherein
the focal position of the projection lens and the focal position of the photographic lens are changed so that their respective focal distances are always almost equal.

2. A projector device according to claim 1, wherein the projection lens and the photographic lens are such that a ratio of an amount of change of the focal position of the projection lens with respect to a drive amount of the drive source, and a ratio of an amount of change of the focal position of the photographic lens with respect to the drive amount of the drive source, are equal.

3. A projector device according to claim 2, wherein the projection lens and the photographic lens have the same optical characteristics.

4. A projector device according to claim 3, wherein the projection lens and the photographic lens are made as identical lens groups each including a plurality of lenses.

5. A projector device comprising:
a projector unit, including a light source and a projection lens whose focal position is variable, that projects an image upon a projection surface with a light flux outputted from the light source that passes through the projection lens;
an image-capturing unit, including a photographic lens whose focal position is variable, that captures an image of a subject with a light flux from the exterior that passes through the photographic lens;
a single drive source that generates drive force for changing both the focal position of the projection lens and the focal position of the photographic lens; and
a lens support unit that supports the projection lens and the photographic lens so that optical axes of the projection lens and the optical axis of the photographic lens are parallel to each other, with an operating point for reception of drive force from the drive source being provided in a vicinity of a center of gravity position in a supporting state, wherein:
the projection lens and the photographic lens are such that a ratio of an amount of change of the focal position of the projection lens with respect to a drive amount of the drive source, and a ratio of an amount of change of the focal position of the photographic lens with respect to the drive amount of the drive source, are equal; and
the focal positions of the projection lens and the focal position of the photographic lens are changed by shifting the lens support unit with drive force that the drive source applies at the operating point.

6. A projector device comprising:
a projector unit, including a light source and a projection lens whose focal position is variable, that projects an image upon a projection surface with a light flux outputted from the light source that passes through the projection lens;
an image-capturing unit, including a photographic lens whose focal position is variable, that captures an image of a subject with a light flux from the exterior that passes through the photographic lens;
a single drive source that generates drive force for changing both the focal position of the projection lens and the focal position of the photographic lens; and
a drive mechanism that drives the projection lens and the photographic lens simultaneously with the drive force of the drive source.

7. A projector device according to claim 6, wherein the drive mechanism drives the projection lens and the photographic lens so that the focal position of the projection lens and the focal position of the photographic lens are located within the same plane with respect to the projector device.

8. A projector device according to claim 7, wherein:
the projection lens and the photographic lens have the same optical characteristics, and are linked to the same drive member; and
the drive mechanism drives the drive member.

9. A projector device according to claim 7, wherein:
the projection lens and the photographic lens are lens groups each having a plurality of lenses and have the same optical characteristics, with respective lenses for focal point adjustment being linked to the same drive member; and
the drive mechanism drives the drive member.

10. A portable telephone, comprising:
a projector device according to claim 1; and
a wireless communication unit that performs communication with another terminal via an external wireless communication facility.

11. A projector device comprising:
a projector unit, including a light source and a projection lens whose focal position is variable, that projects an image upon a projection surface with a light flux outputted from the light source that passes through the projection lens;
an image-capturing unit, including a photographic lens whose focal position is variable, that captures an image of a subject with a light flux from the exterior that passes through the photographic lens; and
a single drive source that generates drive force for changing both the focal position of the projection lens and the focal position of the photographic lens, wherein
when the projector unit is in a non-projection state, the image-capturing unit captures the image of the subject that is different from the image projected by projector unit.

12. A projector device according to claim 1, wherein the single drive source is disposed between the projection lens and the photographic lens.

13. A projector device comprising:
a projector unit, including a light source and a projection lens whose focal position is variable, that projects an image upon a projection surface with a light flux outputted from the light source that passes through the projection lens;
an image-capturing unit, including a photographic lens whose focal position is variable, that captures an image of a subject with a light flux from the exterior that passes through the photographic lens;
a single drive source that generates drive force for changing both the focal position of the projection lens and the focal position of the photographic lens; and
a support member that supports the projection lens and the photographic lens, and that is directly connected to a drive shaft of the drive source, wherein
the single drive source is disposed between the projection lens and the photographic lens.

14. A portable telephone according to claim 10, further comprising:
a display unit including a display device; and
an operation unit, wherein
the image capturing unit and the projector unit are disposed upon the display unit.

15. A portable telephone, comprising:
a projector device according to claim 6; and
a wireless communication unit that performs communication with another terminal via an external wireless communication facility.

16. A portable telephone, comprising:
a projector device according to claim 11; and
a wireless communication unit that performs communication with another terminal via an external wireless communication facility.

* * * * *